United States Patent
Mizuno

(10) Patent No.: US 8,269,887 B2
(45) Date of Patent: Sep. 18, 2012

(54) IMAGE PROCESSING METHOD, IMAGE PROCESSING PROGRAM AND IMAGE PROCESSING APPARATUS, AND PLAYBACK METHOD, PLAYBACK PROGRAM AND PLAYBACK APPARATUS

(75) Inventor: Masayoshi Mizuno, Tokyo (JP)

(73) Assignee: Sony Corporation, Tokyo (JP)

( * ) Notice: Subject to any disclaimer, the term of this patent is extended or adjusted under 35 U.S.C. 154(b) by 1279 days.

(21) Appl. No.: 11/895,885

(22) Filed: Aug. 28, 2007

(65) Prior Publication Data
US 2008/0068499 A1 Mar. 20, 2008

(30) Foreign Application Priority Data
Aug. 30, 2006 (JP) ................................. 2006-233256

(51) Int. Cl.
*H04N 11/20* (2006.01)

(52) U.S. Cl. .......................... 348/448; 348/445; 348/454

(58) Field of Classification Search .................. 348/445; 386/232–234
See application file for complete search history.

(56) References Cited

U.S. PATENT DOCUMENTS

| 6,181,382 | B1 * | 1/2001 | Kieu et al. | 348/459 |
| 2004/0071211 | A1 * | 4/2004 | Washino | 375/240.01 |
| 2004/0150747 | A1 * | 8/2004 | Sita | 348/558 |
| 2005/0078942 | A1 * | 4/2005 | Kato | 386/68 |

FOREIGN PATENT DOCUMENTS
WO  WO 2004/032494  4/2004

* cited by examiner

*Primary Examiner* — Vivek Srivastava
*Assistant Examiner* — Junior Mendoza
(74) *Attorney, Agent, or Firm* — Wolf, Greenfield & Sacks, P.C.

(57) ABSTRACT

An image processing method for converting the frame frequency of a video signal includes a first step for subjecting a video signal having a first frame-frequency to three-times-repeat output and two-times-repeat output of a frame to convert the video signal having the first frame-frequency into a video signal having a second frame-frequency holding a relation of 2:5 as to the first frame-frequency; and a second step for converting the video signal having said second frame-frequency converted in said first step into a video signal having a third frame-frequency holding a relation of 1000:1001 or 1001:1000 as to the second frame-frequency, wherein the second step performs the conversion such that the difference of the number of frames after conversion becomes one or less between a frame group based on the three-times-repeat output frame in the first step, and a frame group based on the two-times-repeat output frame in the first step.

18 Claims, 8 Drawing Sheets

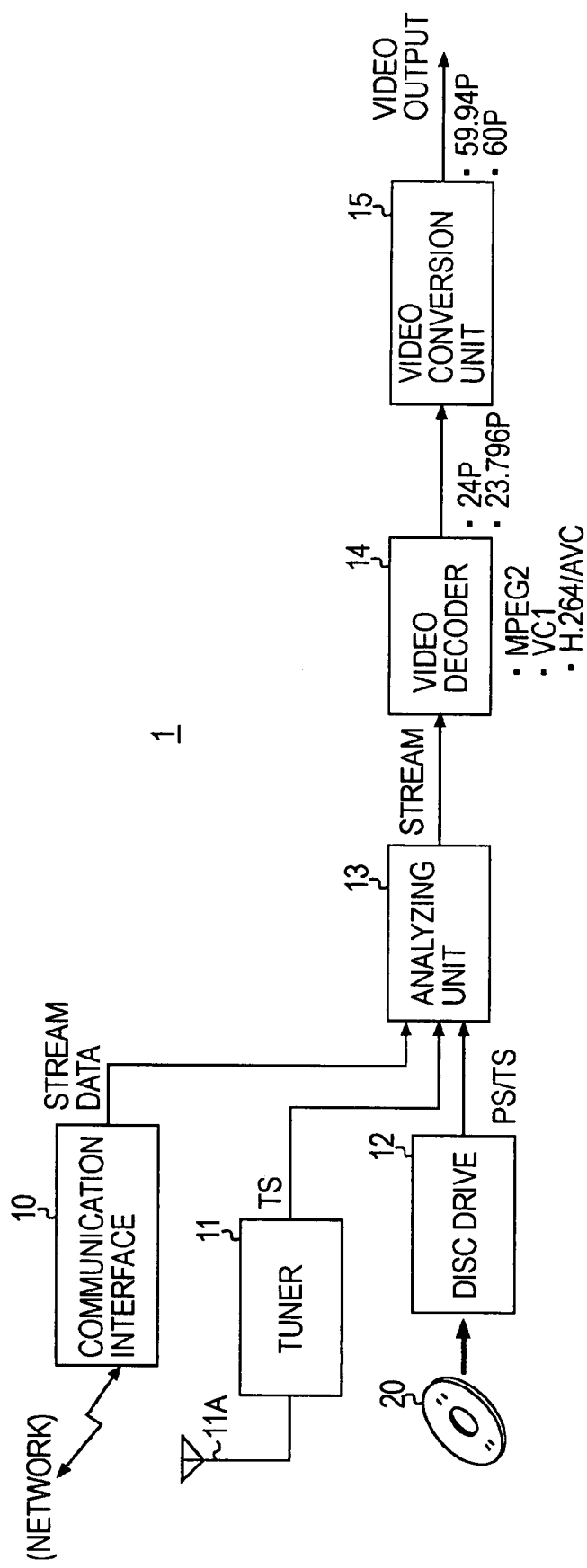

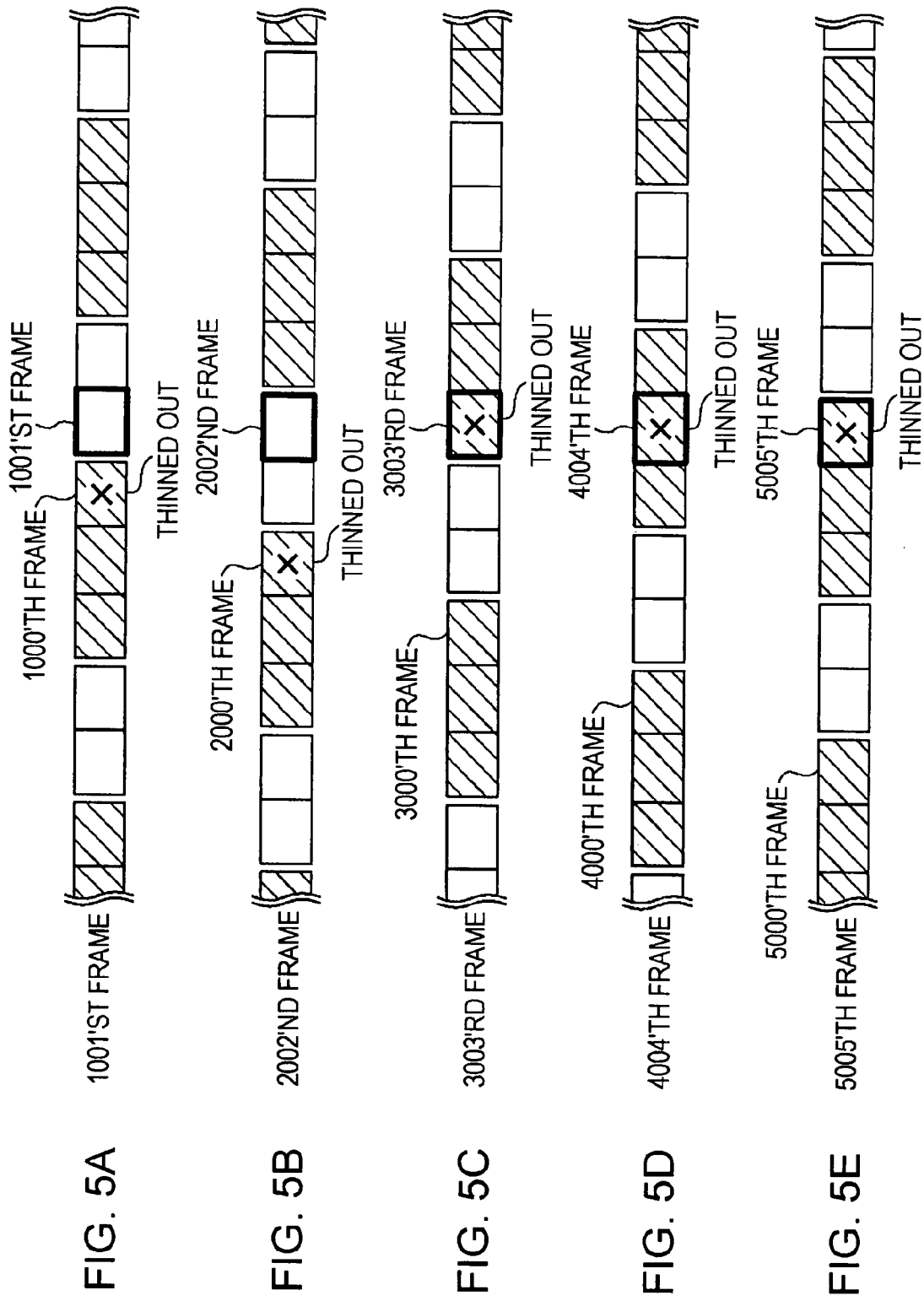

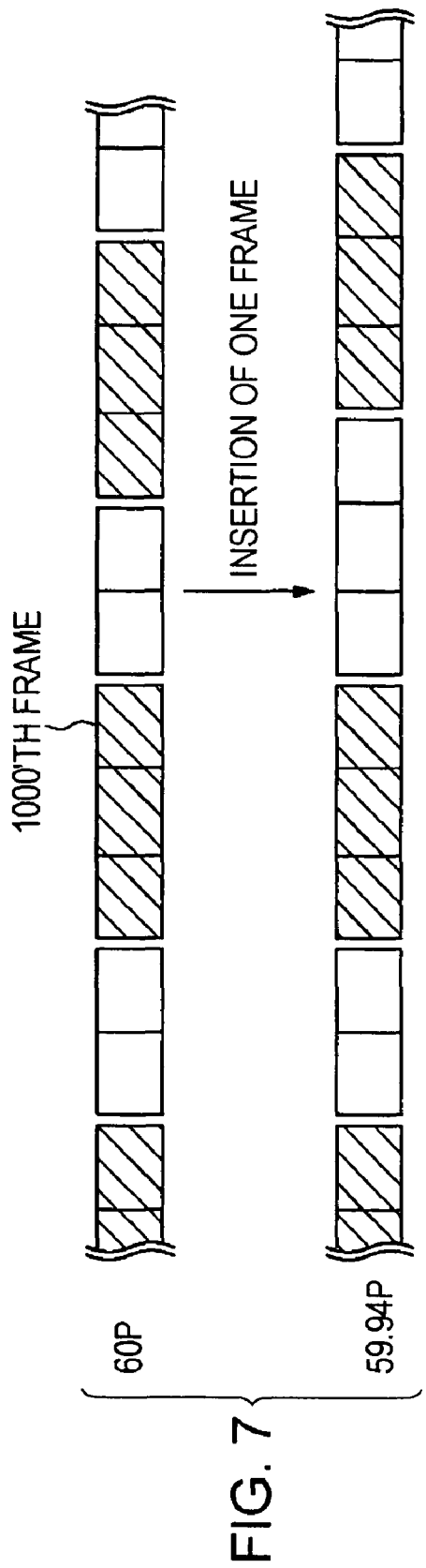

IMAGE PROCESSING METHOD, IMAGE PROCESSING PROGRAM AND IMAGE PROCESSING APPARATUS, AND PLAYBACK METHOD, PLAYBACK PROGRAM AND PLAYBACK APPARATUS

CROSS REFERENCES TO RELATED APPLICATIONS

The present invention contains subject matter related to Japanese Patent Application JP 2006-233256 filed in the Japanese Patent Office on Aug. 30, 2006, the entire contents of which are incorporated herein by reference.

BACKGROUND OF THE INVENTION

1. Field of the Invention

The present invention relates to an image processing method, an image processing program and an image processing apparatus, and a playback method, a playback program and a playback apparatus, which are suitably employed for converting the frame frequency of an image signal.

2. Description of the Related Art

In recent years, with realization of digital high vision broadcasting and the like, a progressive-scan video signal having the frame frequency of 59.94 Hz, from which a higher definition image can be projected, has come to be frequently employed for the format of a video signal, instead of an existing interlace-scan video signal having the frame frequency of 29.97 Hz (in the case of NTSC (National Television System Committee)). On the other hand, for example, movie images have been traditionally created using optical film, which becomes a progressive-scan video signal at 24 frames per second, i.e., with the frame frequency of 24 Hz.

Processing configured to generate a video signal having the frame frequency of 59.94 Hz from a video signal having the frame frequency of 24 Hz is realized by converting each frame of a video signal having the original frame frequency of 24 Hz into a video signal having the frame frequency of 60 Hz once, and then converting this video signal of 60 Hz into a video signal having the frame frequency of 59.94 Hz.

In the event of converting a video signal having the frame frequency of 24 Hz into a video signal having the frame frequency of 59.95 Hz (60 Hz), processing is performed wherein a video signal having the frame frequency of 24 Hz is alternately converted into the three frames or two frames of a video signal having the frame frequency of 60 Hz with a predetermined conversion pattern, which is referred to as 3-2 pulldown (or 2-3 pulldown).

With International Publication No. 04/032494 pamphlet, a technique has been described wherein a video signal having the frame frequency of 24 Hz based on a film material is converted into a progressive-scan video signal having the frame frequency of 59.94 Hz by the 3-2 pulldown processing.

SUMMARY OF THE INVENTION

However, this known technique is not without problems. To illustrate, let us consider processing configured to convert a progressive-scan (hereafter, referred to as 24 p) video signal having the frequency of 24 Hz converted into a progressive-scan (hereafter, referred to as 59.94 p) video signal having the frequency of 59.94 Hz using the 3-2 pulldown.

A video signal of 24 p has high compatibility with a progressive-scan (hereafter, referred to as 60 p) video signal having the frame frequency of 60 Hz, so first, the video signal of 24 p is converted into a video signal of 60 p using the 3-2 pulldown processing. There is a 2:5 relation between the frame frequency of the video signal of 24 p and the frame frequency of the video signal of 60 p. Accordingly, as shown in one example of FIG. 8, for example, converting of the video signal of 24 p into the video signal of 60 p is performed by subjecting the frames of the video signal of 24 p (see FIG. 8(a)) to three-times repeat output and two-times repeat output alternately for each frame using the 3-2 pulldown to output these with the frame frequency of 60 Hz (see FIG. 8(b)).

Next, the video signal of 60 p into which the video signal of 24 p has been converted with the 3-2 pulldown is converted into a video signal of 59.94 p. Now, there is a relation of 59.94 Hz=60 Hz×(1000/1001) between 60 Hz and 59.94 Hz, so a video signal of 59.94 p can be generated by thinning out the frames of the video signal of 60 p at the rate of one frame per 1001 frames.

Thus, in the event of converting a video signal of 24 p into a video signal of 59.94 p, one frame is thinned out every 1001 frames of the video signal of 60 p generated by the 3-2 pulldown processing. Therefore, repeat of processing results in a state occurring at a predetermined timing wherein one frame is thinned out from a group where a frame of 24 p is repeated twice at the 3-2 pulldown processing.

For example, according to the 3-2 pulldown processing, a frame of a video signal of 24 p is repeatedly output three times, and the next frame is repeatedly output twice, and in the event that the three-times repeat output and the two-times repeat output of the same frame are alternately performed, the 1000th frame of a video signal of 60 p becomes a frame of a group wherein a frame of 24 p is repeated twice at the 3-2 pulldown processing. In the event of configuring to perform thinning out every 1001 frames, the 1001st frame to be thinned out becomes a frame of a group wherein a frame of 24 p is repeated three times at the 3-2 pulldown processing. A frame to be thinned out next becomes the 2002nd frame of the video signal of 60 p, and the frame to be thinned out next thereof becomes the 3003rd frame of the video signal of 60 p. Further, the frame to be thinned out next thereof becomes the 4004th frame of the video signal of 60 p.

This 4004th frame belongs to the group wherein a frame of 24 p is repeated twice at the 3-2 pulldown processing, and before and after one frame remaining in this group after thinning out processing belongs to the group wherein a frame of 24 p is repeated three times at the 3-2 pulldown processing. In this case, the repeat pattern of the video signal to be displayed becomes three frames, one frame, and three frames, which leads to a problem wherein display will appear unnatural at predetermined cycles.

Accordingly, it is desirable to provide an image processing method, an image processing program and an image processing apparatus, and a playback method, a playback program and a playback apparatus, whereby display can be prevented from being unnatural in the event that a video signal already subjected to the 3-2 pulldown or 2-3 pulldown is further subjected to conversion processing based on the relation of the 1000th frame/the 1001st frame.

According to an embodiment of the present invention, an image processing method configured to convert the frame frequency of a video signal includes the steps of: first conversion configured to subject a video signal having a first frame frequency to three-times repeat output and two-times repeat output of a frame for each frame to convert the video signal having the first frame frequency into a video signal having a second frame frequency holding a relation of 2:5 as to the first frame frequency; and second conversion configured to convert the video signal having the second frame frequency converted in the first conversion step into a video signal having a third frame frequency holding a relation of 1000:1001 or 1001:1000 as to the second frame frequency, wherein the second conversion step is configured to perform the conversion such that the difference of the number of frames after conversion becomes one or less between a frame group based on the three-times repeat output frame according to the first conversion step, and a frame group based on the two-times repeat output frame according to the first conversion step, which is contiguous to the frame group based on the three-times repeat output frame.

Also, according to an embodiment of the present invention, an image processing program is configured to cause a computer apparatus to execute an image processing method configured to convert the frame frequency of a video signal includes the steps of: first conversion configured to subject a video signal having a first frame frequency to three-times repeat output and two-times repeat output of a frame for each frame to convert the video signal having the first frame frequency into a video signal having a second frame frequency holding a relation of 2:5 as to the first frame frequency; and second conversion configured to convert the video signal having the second frame frequency converted in the first conversion step into a video signal having a third frame frequency holding a relation of 1000:1001 or 1001:1000 as to the second frame frequency, wherein the second conversion step is configured to perform the conversion such that the difference of the number of frames after conversion becomes one or less between a frame group based on the three-times repeat output frame according to the first conversion step, and a frame group based on the two-times repeat output frame according to the first conversion step, which is contiguous to the frame group based on the three-times repeat output frame.

Also, according to an embodiment of the present invention, an image processing apparatus configured to convert the frame frequency of a video signal includes: a first conversion unit configured to subject a video signal having a first frame frequency to three-times repeat output and two-times repeat output of a frame for each frame to convert the video signal having the first frame frequency into a video signal having a second frame frequency holding a relation of 2:5 as to the first frame frequency; and a second conversion unit configured to convert the video signal having the second frame frequency converted by the first conversion unit into a video signal having a third frame frequency holding a relation of 1000:1001 or 1001:1000 as to the second frame frequency, wherein the second conversion unit is configured to perform the conversion such that the difference of the number of frames after conversion becomes one or less between a frame group based on the three-times repeat output frame according to the first conversion unit, and a frame group based on the two-times repeat output frame according to the first conversion unit, which is contiguous to the frame group based on the three-times repeat output frame.

As described above, with these arrangements, the video signal having the first frame frequency is alternately subjected to the three-times repeat output and two-times repeat output of a frame for each frame to convert the video signal having the first frame frequency into the video signal having the second frame frequency holding a relation of 2:5 as to the first frame frequency, and the video signal having the second frame frequency is converted into the video signal having the third frame frequency holding a relation of 1000:1001 or 1001:1000 as to the second frame frequency, wherein the conversion is performed such that the difference of the number of frames after conversion becomes one or less between the frame group based on the three-times repeat output frame, and the frame group based on the two-times repeat output frame, which is contiguous to the frame group based on the three-times repeat output frame, and accordingly, the difference of the number of repeats of the same frame is small in the event of displaying the frame group based on the two-times repeat output frame following the frame group based on the three-times repeat output frame as to the video signal having the first frame frequency after the conversion into the video signal having the third frame frequency.

The video signal having the first frame frequency is alternately subjected to the three-times repeat output and two-times repeat output of a frame for each frame to convert the video signal having the first frame frequency into the video signal having the second frame frequency holding a relation of 2:5 as to the first frame frequency, and the video signal having the second frame frequency is converted into the video signal having the third frame frequency holding a relation of 1000:1001 or 1001:1000 as to the second frame frequency, wherein the conversion is performed such that the difference of the number of frames after conversion becomes one or less between the frame group based on the three-times repeat output frame, and the frame group based on the two-times repeat output frame, which is contiguous to the frame group based on the three-times repeat output frame, and accordingly, the difference of the number of repeats of the same frame is small in the event of displaying the frame group based on the two-times repeat output frame following the frame group based on the three-times repeat output frame as to the video signal having the first frame frequency after the conversion into the video signal having the third frame frequency, thereby providing an advantage wherein display preventing unnaturalness can be obtained, in the event of further subjecting the video signal subjected to the 3-2 pulldown or 2-3 pulldown processing to the conversion processing based on the relation of the 1000th frame/the 1001st frame.

Also, according to an embodiment of the present invention, a playback method includes the steps of: playback configured to play a video signal; determination configured to determine the frame frequency of the video signal played in the playback step; first conversion configured, in the event that determination is made in the determination step that the video signal played in the playback step is a video signal having a first frame frequency, to subject the video signal to three-times repeat output and two-times repeat output of a frame for each frame to convert the video signal having the first frame frequency into a video signal having a second frame frequency holding a relation of 2:5 as to the first frame frequency; and second conversion configured to convert the video signal having the second frame frequency converted in the first conversion step into a video signal having a third frame frequency holding a relation of 1000:1001 or 1001:1000 as to the second frame frequency, wherein the second conversion step is configured to perform the conversion such that the difference of the number of frames after conversion becomes one or less between a frame group based on the three-times repeat output frame according to the first conversion step, and a frame group based on the two-times repeat output frame according to the first conversion step, which is contiguous to the frame group based on the three-times repeat output frame.

Also, according to an embodiment of the present invention, a playback program is configured to cause a computer apparatus to execute a playback method including the steps of: playback configured to play a video signal; determination configured to determine the frame frequency of the video signal played in the playback step; first conversion configured, in the event that determination is made in the determination step that the video signal played in the playback step is a video signal having a first frame frequency, to subject the video signal to three-times repeat output and two-times repeat output of a frame for each frame to convert the video signal having the first frame frequency into a video signal having a second frame frequency holding a relation of 2:5 as to the first frame frequency; and second conversion configured to convert the video signal having the second frame frequency converted in the first conversion step into a video signal having a third frame frequency holding a relation of 1000:1001 or 1001:1000 as to the second frame frequency, wherein the second conversion step is configured to perform the conversion such that the difference of the number of frames after conversion becomes one or less between a frame group based on the three-times repeat output frame according to the first conversion step, and a frame group based on the two-times repeat output frame according to the first conversion step, which is contiguous to the frame group based on the three-times repeat output frame.

Also, according to an embodiment of the present invention, a playback apparatus includes: a playback unit configured to play a video signal; a determining unit configured to determine the frame frequency of the video signal played with the playback unit; a first conversion unit configured, in the event that determination is made with the determination unit that the video signal played with the playback unit is a video signal having a first frame frequency, to subject the video signal to three-times repeat output and two-times repeat output of a frame for each frame to convert the video signal having the first frame frequency into a video signal having a second frame frequency holding a relation of 2:5 as to the first frame frequency; and a second conversion unit configured to convert the video signal having the second frame frequency converted with the first conversion unit into a video signal having a third frame frequency holding a relation of 1000:1001 or 1001:1000 as to the second frame frequency, wherein the second conversion unit is configured to perform the conversion such that the difference of the number of frames after conversion becomes one or less between a frame group based on the three-times repeat output frame according to the first conversion unit, and a frame group based on the two-times repeat output frame according to the first conversion unit, which is contiguous to the frame group based on the three-times repeat output frame.

With these arrangements, the frame frequency of the played video signal is determined, and in the event that determination is made that the played video signal is the video signal having the first frame frequency, the video signal having the first frame frequency is alternately subjected to the three-times repeat output and two-times repeat output of a frame for each frame, the video signal having the first frame frequency is converted into the video signal having the second frame frequency holding a relation of 2:5 as to the first frame frequency, and the video signal having the second frame frequency is converted into the video signal having the third frame frequency holding a relation of 1000:1001 or 1001:1000 as to the second frame frequency, wherein the convert is performed such that the difference of the number of frames after conversion becomes one or less between the frame group based on the three-times repeat output frame, and the frame group based on the two-times repeat output frame, which is contiguous to the frame group based on the three-times repeat output frame, and accordingly, the difference of the number of repeats of the same frame is small in the event of displaying the frame group based on the two-times repeat output frame following the frame group based on the three-times repeat output frame as to the video signal having the first frame frequency after the convert into the video signal having the third frame frequency.

The frame frequency of the played video signal is determined, and in the event that determination is made that the played video signal is the video signal having the first frame frequency, the video signal having the first frame frequency is alternately subjected to the three-times repeat output and two-times repeat output of a frame for each frame, the video signal having the first frame frequency is converted into the video signal having the second frame frequency holding a relation of 2:5 as to the first frame frequency, and the video signal having the second frame frequency is converted into the video signal having the third frame frequency holding a relation of 1000:1001 or 1001:1000 as to the second frame frequency, wherein the convert is performed such that the difference of the number of frames after conversion becomes one or less between the frame group based on the three-times repeat output frame, and the frame group based on the two-times repeat output frame, which is contiguous to the frame group based on the three-times repeat output frame, and accordingly, the difference of the number of repeats of the same frame is small in the event of displaying the frame group based on the two-times repeat output frame following the frame group based on the three-times repeat output frame as to the video signal having the first frame frequency after the convert into the video signal having the third frame frequency, thereby providing an advantage wherein display preventing unnaturalness can be obtained, in the event of further subjecting the video signal subjected to the 3-2 pulldown or 2-3 pulldown processing to the conversion processing based on the relation of the 1000th frame/the 1001st frame.

BRIEF DESCRIPTION OF THE DRAWINGS

FIG. 2 is a block diagram schematically illustrating the configuration of one example of a playback apparatus which can be applied to an embodiment of the present invention;

FIGS. 5A through 5E are schematic diagrams for describing processing at the time of 2-3 pulldown according to an embodiment of the present invention;

FIG. 7 is a schematic diagram for describing processing at the time of 2-3 pulldown according to a modification of an embodiment of the present invention.

DESCRIPTION OF THE PREFERRED EMBODIMENTS

An embodiment of the present invention will be described below with reference to the drawings. An image processing method according to an embodiment of the present invention will be described schematically with reference to FIGS. 1A through 1E. Now, let us consider processing configured to convert a progressive-scan (hereafter, referred to as 24 p) video signal having the frequency of 24 Hz being subjected to the 3-2 pulldown processing, and being converted into a progressive-scan (hereafter, referred to as 59.94 p) video signal having the frequency of 59.94 Hz.

With the 3-2 pulldown processing, the three-times repeat and two-times repeat of a frame of a video signal of 24 p are alternately performed in order for each frame, and accordingly, the video signal generated at the 3-2 pulldown processing includes a cycle of five frames. Hereafter, let us say that a gathering made up of adjacent frames wherein a frame of 24 p is repeated n times at the 3-2 pulldown processing will be referred to a group, a group made up of three adjacent frames wherein a frame of 24 p is repeated three times will be referred to as a three-frame group, and a group made up of two adjacent frames wherein a frame of 24 p is repeated twice will be referred to as a two-frame group.

Note that in FIGS. 1A through 1E, the frames of a three-frame group are indicated by hatching, and thus can be distinguished from two-frame groups. This holds true with the other similar drawings.

On the other hand, as already described in the section of Description of the Related Art, with the processing configured to convert a video signal of 24 p into a video signal of 59.94 p, basically, a video signal of 24 p is converted into a video signal of 60 p by the 3-2 pulldown processing (or 2-3 pulldown processing), and one frame is thinned out every 1001 frames of the video signal of 60 p to generate a video signal of 59.94 p.

The position of the 1001st frame in this 1001 frame cycle as to a five frame cycle by the above-mentioned 3-2 pulldown processing is shifted by one frame every 1001 frames. That is to say, as exemplified in FIGS. 1A through 1E, with the first frame as a starting frame, the 1001st frame corresponds to the first frame of a three-frame group according to the 3-2 pulldown processing (see FIG. 1A). The 2002nd frame corresponds to the middle frame of a three-frame group (see FIG. 1B). Hereafter, similarly, the 3003rd frame corresponds to the last frame of a three-frame group (see FIG. 1C), and the 4004th frame corresponds to the first frame of a two-frame group (see FIG. 1D). The 5005th frame corresponds to the last frame of a two-frame group (see FIG. 1E).

Figure 1A:
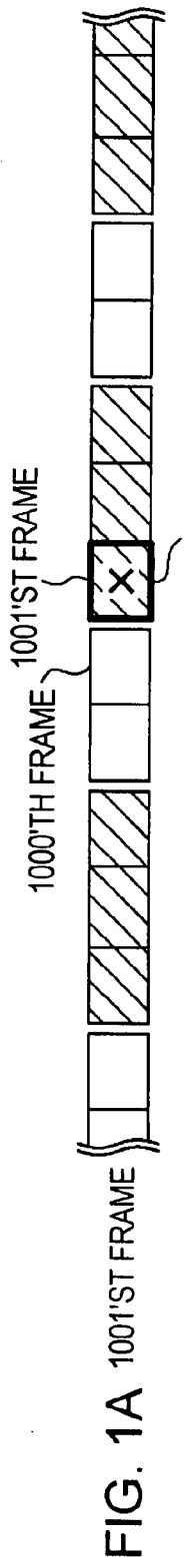
FIGS. 1A through 1E are schematic diagrams for describing an image processing method according to an embodiment of the present invention.
Figure 1B:
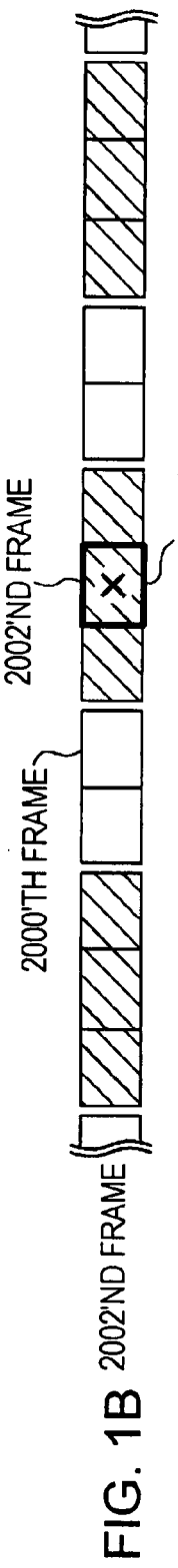
Figure 1C:
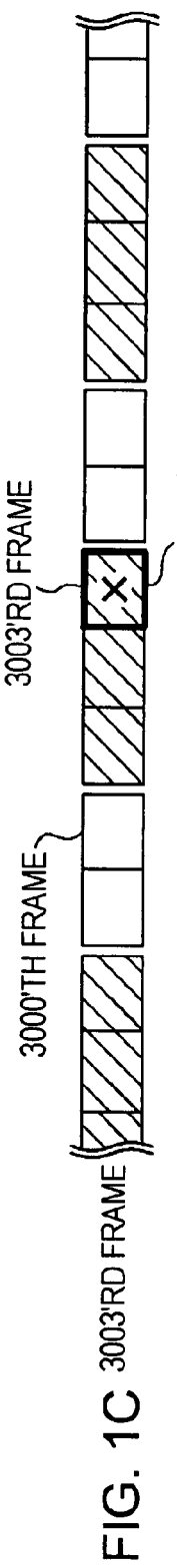
Figure 1D:
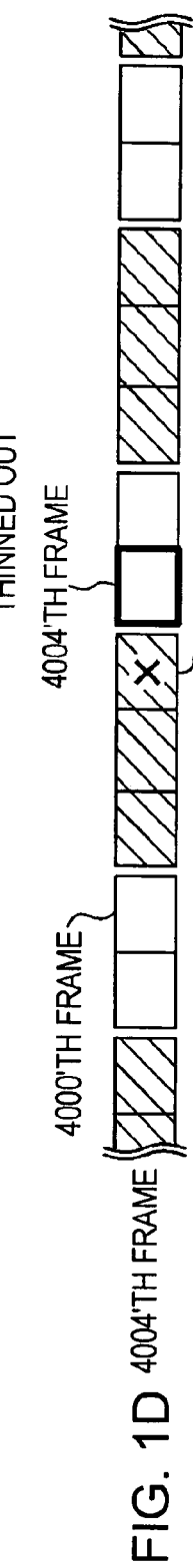
Figure 1E:
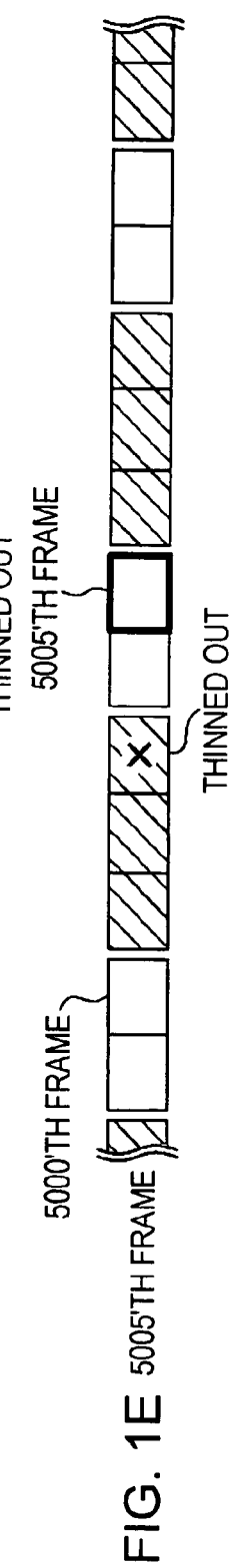

Now, upon thinning out being performed for each 1001st frame, as exemplified in FIGS. 1D and 1E, with the 4004th frame and the 5005th frame, the two-frame groups are subjected to thinning out. In this case, immediately after playback of a three-frame group, one frame wherein one frame is thinned out from the two-frame group is played, then next, playback of a three-frame is performed, resulting in an unnatural-looking image. That is to say, the difference of the number of frames between the group in which thinning out has been performed, before and after the group thereof, i.e., the group in which thinning out has not been performed, becomes two or more, and consequently, display becomes unnatural.

With an embodiment of the present invention, thinning out processing at the time of a video signal of 24 p being converted into a video signal of 60 p using the 3-2 pulldown processing, is performed such that the difference of the number of frames between adjacent groups becomes one or less, of the groups of a video signal frame of 60 p wherein a video signal frame of 24 p is repeated.

As one example, as exemplified in FIGS. 1D and 1E, in the event that the (1001×m)'th frame (m is a natural number) is included in a two-frame group, thinning out is configured to be performed upon a frame of a three-frame group in the vicinity of the relevant two-frame group. With the examples in FIGS. 1D and 1E, thinning out is performed upon a frame of a three-frame group immediately before the two frame group including the (1001×m)'th frame.

On the other hand, as exemplified in FIGS. 1A through 1C, in the event that the (1001×m)'th frame of a video signal of 60 p is included in a three-frame group, thinning out is performed upon the relevant three-frame group frame.

Note that with FIGS. 1A through 1E, for example, description has been made wherein in FIGS. 1A through 1C the first frame, second frame, and third frame of a three-frame group are thinned out, and in each of FIGS. 1D and 1E the third frame within a three-frame group is thinned out, but actually, in each case, any frame within a three-frame group may be thinned out.

Thinning out control is thus performed upon the video signal of 60 p converted from the video signal of 24 p using the 3-2 pulldown processing, and accordingly, the difference of the number of frames between a group in which frame thinning out has been performed, and before and after the relevant group, i.e., a group in which thinning out has not been performed is not equal to or greater than two frames, thereby preventing unnatural display.

FIG. 2 schematically illustrates the configuration of one example of a playback apparatus 1 to which can be applied to an embodiment of the present invention. With this embodiment of the present invention, the supply source of a video signal of 24 p is not restricted in particular. For example, video data of 24 p can be considered to be supplied by a communication network such as the Internet, or digital television broadcasting. Also, video data of 24 p can be considered to be supplied by being recorded in the recording medium 20 which is detachably mountable. Examples of the recording medium 20 include a playback-only or recordable disc-shaped recording medium, semiconductor memory such as flash memory, a detachably mountable hard disk, or the like. Examples of a disc-shaped recording medium include DVD (Digital Versatile Disc), Blu-ray Disc (registered trademark), and CD (Compact Disc).

A communication interface (I/F) 10 performs data communication using a predetermined protocol as to a communication network. For example, the communication I/F 10 performs communication via the internet using TCP/IP (Transmission Control Protocol/Internet Protocol) as a protocol. The video data obtained via the network by the communication I/F 10 is output from the communication I/F 10 in a predetermined stream data format corresponding to a video data encoding system, and supplied to an analyzing unit 13.

A tuner 11 demodulates the radio waves of a digital television broadcasting received by an antenna 11A, and outputs this as digital data. As one example, with digital television broadcasting, in the event that multiplexing and transmission of data conforming to the rules of MPEG2 (moving Pictures Experts Group 2) has been performed, the tuner 11 outputs the digital data in a transport stream (TS) format. The transport stream output from the tuner 11 is supplied to the analyzing unit 13.

In the event that the recording medium 20 is a disc-shaped recording medium, a disc drive 12 plays the video data recorded in the loaded recording medium 20. Video data is recorded in the recording medium 20 in the above-mentioned transport stream format, for example. Video data is recorded in the recording medium 20 in the program stream (PS) format conforming to MPEG2 in some cases. The transport stream or program stream played from the recording medium 20 is supplied to the analyzing unit 13.

Note that FIG. 2 illustrates that the playback apparatus 1 is configured so as to include all of the units configured to obtain video data from the communication network (communication I/F 10), the units configured to obtain video data from digital television broadcasting (antenna 11A and tuner 11), and the units configured to obtain video data from the detachably mountable recording medium 20 (disc drive 12), but the configuration of the playback apparatus 1 is not restricted to this example. That is to say, it is sufficient for the playback apparatus 1 to include one or more of these video data obtaining units. Further, an arrangement may be made wherein the playback apparatus 1 includes none of these video data obtaining units, and a video stream is directly supplied to the later-described analyzing unit 13 or video decoder 14.

The analyzing unit 13 analyzes supplied data, and outputs a data stream regarding video data. For example, in the event that video data is supplied from the tuner 11 or disc drive 12 as a transport stream, the analyzing unit 13 analyzes a PID for each transport packet, and collects packets including video data. A PES (Packetized Elementary Stream) packet is reconfigured from the data stored in the payloads of the collected packets. Subsequently, the analyzing unit 13 restores the video stream by extracting the elementary stream of video data for each PES packet based on the information stored in the header of a PES packet, or the like.

In the event that video data is supplied from the disc drive 12 as a program stream, the analyzing unit 13 separates a PES packet based on header information such as a pack header or the like, and restores the video stream by extracting the elementary stream of the video data for each PES packet based on the information stored in the header of a PES packet.

In the event that video data is supplied in a predetermined video stream format from the communication I/F 10 via the communication network, the analyzing unit 13 analyzes the supplied stream structure, and subjects this to predetermined conversion processing as necessary to output as a video stream in the format which the subsequent video decoder 14 can handle.

The video stream output from the analyzing unit 13 is supplied to the video decoder 14. The video decoder 14 decodes the supplied video stream, and outputs this as the video data of the base band.

Now, an encoding system of a video stream to be transmitted, for example, by MPEG is not restricted to MPEG2. For example, a video stream encoded with an encoding system which is regulated with ITU-T (International Telecommunication Union-Telecommunication Standardization Sector) recommendation H.264 or ISO (International Organization for Standardization)/IEC (International Electrotechnical Commission) international standards 14496-10 (MPEG-4 part 10) Advanced Video Coding (hereafter, abbreviated as H.264/AVC), or a video stream encoded with VC1 (Video Codec 1), can be transmitted by MPEG2.

Also, the video data obtained via the communication network is also encoded using various types of encoding system such as the above-mentioned MPEG2, H.264/AVC, VC1, or the like.

The video decoder 14 can decode a video stream so as to correspond to each of those multiple encoding formats. In this case, the video decoder 14 determines an encoding system based on, for example, the header information of a video stream, or attribute information to be added to a video stream in a certain manner, and decodes the video stream with the corresponding decoding system. Also, an encoding format can be set under the control from the outside based on user operations or the like.

It is needless to say that the video decoder 14 can be configured so as to handle a single encoding format alone. In this case, upon a video stream of which the encoding format is not an encoding format which the video decoder 14 can handle being supplied, error processing is performed, for example.

Also, the video decoder 14 obtains the frame rate, i.e., the frame frequency of the supplied video stream. As one example, with the above-mentioned MPEG2, H.254/AVC, and VC1, information relating to a frame rate is stored in the header portion of a stream. The video decoder 14 extracts the information relating to a frame rate from the header portion of the supplied video stream for example, and obtains the frame rate of the relevant video stream.

More specifically, in the case of MPEG2, a frame rate frame_rate_value is described in a data item frame_rate_code within a sequence header. In the case of H.254/AVC, the frame rate frame_rate_value can be obtained by calculating (time_scale/num_units_in_tick)/2 using a parameter num_units_in_tick and a parameter time_scale within a sequence parameter vui_parameters( ) in a sequence parameter set. Also, in the case of VC1, the frame rate frame_rate_value can be obtained by calculating (value of Frame Rate Numerator)/(value of Frame Rate Denominator) using the value of Frame Rate Number and the value of Frame Rate Denominator indicated with an item FRAMERATENR and an item FRAMERATEDR respectively in a sequence layer SEQUENCE LAYER( ).

The video data of which the video stream is decoded, and the frame rate information obtained from the video stream in a certain manner, are supplied to a video conversion unit 15 from the video decoder 14. The video data is supplied to the video conversion unit 15 in accordance with the frame rate of the relevant video data, for example. The video conversion unit 15 performs conversion of the frame frequency of the relevant video data based on the frame rate information supplied from the video decoder 14.

As one example, in the event that the supply destination of the video data output from the video conversion unit 15 employing a video format conformed to NTSC (National Television System Committee), the frame frequency of the video data output from the video conversion unit 15 needs to be 59.94 Hz (in the case of 69.94 p). When assuming that the frame frequency of the supplied video data is set to 24 Hz based on the frame information supplied from the video decoder 14, the video conversion unit 15 first subjects the relevant video data to the 3-2 pulldown processing to convert this video data of 24 p into video data of 60 p, and further converts this video data of 60 p into video data of 59.94 p.

The video conversion unit 15 performs processing configured to further convert the video data of 60 p converted from the video data of 24 p by the 3-2 pulldown processing into video data of 59.94 p by thinning out one frame within a 1001 frame cycle such that the difference of the number of frames between adjacent groups becomes one or less, of the groups of the video data of 60 p where the frame of the video data of 24 p is repeated.

More specifically, the video conversion unit 15 employs the method described with reference to FIG. 1, and an arrangement is made wherein in the event that the (1001×m)'th frame is a frame belonging to a two-frame group, a frame of the three-frame group immediately before this two-frame group is thinned out, and in the event that the (1001×m)'th frame is a frame belonging to a three-frame group, the frame of the (1001×m)'th frame is thinned out.

Note that the method of the 3-2 pulldown processing by the video conversion unit 15 is not restricted to the above-mentioned method. For example, an arrangement may be made wherein the 3-2 pulldown processing is performed in a state in which thinning out processing every 1001 frames is not performed to convert video data of 24 p into video data of 60 p, and one frame of this video data of 60 p is thinned out every 1001 frames.

Description has been made above wherein each unit of the playback apparatus 1 shown in FIG. 2 is made up of hardware, but the configuration thereof is not restricted to this example. That is to say, all of or a part of the analyzing unit 13, video decoder 14, and video conversion unit 15 of the playback apparatus 1 can be also configured by executing a predetermined program on a CPU (Central Processing Unit). The program may be stored beforehand in unshown ROM (Read Only Memory) included in the playback apparatus 1, or may be provided in a state of being recorded in a recording medium such as DVD-ROM or CD-ROM. The program can also be provided via a communication network such as the Internet. The provided program is stored in an unshown hard disk drive, non-volatile memory, or the like included in the playback apparatus 1, read in the CPU, and executed.

Figure 3:
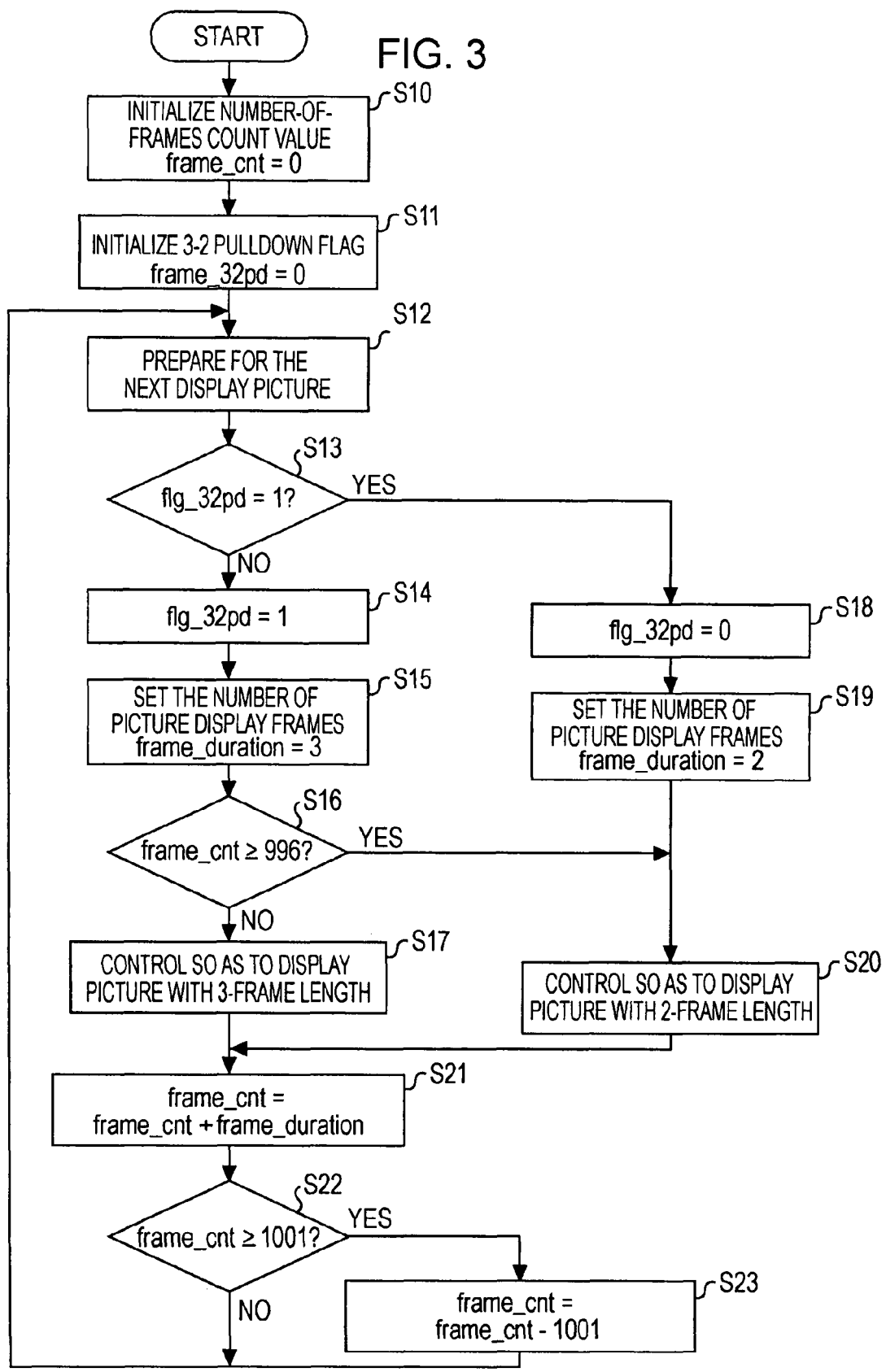
FIG. 3 is a flowchart illustrating one example of video conversion processing according to an embodiment of the present invention.
Figure 4:
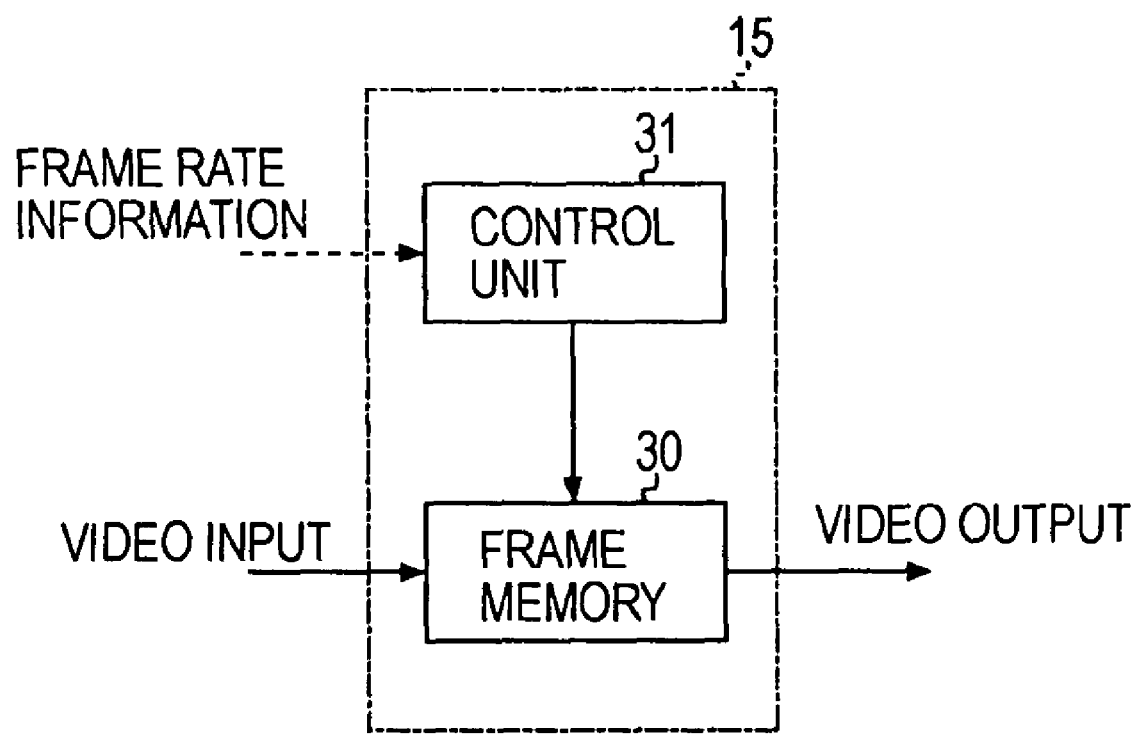
FIG. 4 is a block diagram illustrating the configuration of one example of a video conversion unit.

FIG. 3 is a flowchart illustrating video conversion processing of one example according to an embodiment of the present invention. The video conversion processing exemplified in FIG. 3 is performed at the above-mentioned video conversion unit 15 of the playback apparatus 1. The video conversion unit 15 is, for example, as exemplified in FIG. 4, made up of frame memory 30 and a control unit 31, and the control unit 31 performs the thinning out processing every 1001 frames along with the 3-2 pulldown processing and 3-2 pulldown processing by controlling the readout of video data from the frame memory 30.

As one example, with the 3-2 pulldown processing wherein video data of 24 p is converted into video data of 60 p, for example, the video data supplied with 24 p, i.e., with the frame frequency of 24 Hz is stored in the frame memory 30 in increments of frame, and the control unit 31 performs control so as to read out the same frame three times or twice repeatedly. At this time, controlling the number of times of repeats at the time of repeatedly reading out the same frame from the frame memory 30 enables processing configured to thin out predetermined one frame every 1001 frames to be performed, whereby video data of 59.94 p can be obtained.

Also, the control unit 31 can change the operation mode of the video conversion unit 15 depending on the frame rate supplied from the video decoder 14, the setting information of the frame rate of the video data output from the video conversion unit 15, and so forth. For example, in the event that the frame rate information supplied from the video decoder 14 indicates 24 p, and the frame rate setting of the output video data is 59.94 p, the operating mode is set so as to perform processing such as described below using the flowchart in FIG. 3.

In FIG. 3, the variables employed at the control unit 31 are initialized prior to the processing of video data. Specifically, in step S10 the value of a number-of-frames count value frame_cnt is set to "0", and in step S11 the value of a 3-2 pulldown flag flg_32pd is set to "0".

Note that the number-of-frames count value frame_cnt represents the number of frames at video data of 60 p, and is reset every 1001 frames. Also, the 3-2 pulldown flag flg_32pd is a flag representing whether or not the frame of video data of 24 p is output as a three-frame group or a two-frame group at the 3-2 pulldown processing. For example, with the value of the 3-2 pulldown flag flg_32pd, "0" indicates that a frame of video data of 24 p is output as a frame of a three-frame group, and "1" indicates that a frame of video data of 24 p is output as a frame of a two-frame group.

For example, upon one frame worth of video data decoded at the video decoder 14 being written in, and the next display picture being prepared (step S12), in the next step S13 determination is made whether or not the value of the 3-2 pulldown flag flg_32pd is "1". In the event that determination is made that the value of the flag is not "1", the processing proceeds to step S14, where the value of the 3-2 pulldown flag flg_32pd is set to "1", and in the next step S15 the value of the number of picture display frames frame_duration is set to "3".

In the next step S16, determination is made whether or not the value of the number-of-frames counter frame_cnt is not less than "996". In the event that determination is made that the value of the number-of-frames counter frame_cnt is not less than "996", the processing proceeds to later-described step S20, and in the event of less than "996", the processing proceeds to step S17.

In step S17, a picture is controlled so as to be displayed with the length of three frames. For example, the control unit 31 performs control so as to read out one frame worth of video data written in the frame memory 30 three times repeatedly at the timing of a frame frequency of 59.94 Hz. The video data read out from the frame memory 30 is output from the video conversion unit 15. Upon a picture being output, the processing proceeds to step S21.

On the other hand, in the event that determination is made in the above-mentioned step S13 that the value of the 3-2 pulldown flag flg_32pd is "1", the processing proceeds to step S18. In step S18, the value of the 3-2 pulldown flag flg_32pd is set to "0", and in the next step S19 the value of the number of picture display frames frame_duration is set to "2". Subsequently, in step S20, control is made so as to display a picture with the length of two frames. This display control is the same as the control in the above-mentioned step S17, so detailed description thereof will be omitted. Upon display of a picture being performed, the processing proceeds to step S21.

In step S21, the value of the number of picture display frames frame_duration is added to the value of the number-of-frames count value frame_cnt, thereby obtaining a new number-of-frames count value frame_cnt. Subsequently, in the next step S22, determination is made whether or not the value of the number-of-frames count value frame_cnt is not less than "1001". In the event that determination is made that the value is less than "1001", the processing returns to step S12, and the next display picture is prepared.

In the event that determination is made in step S22 that the value of the number-of-frames count value frame_cnt is not less than "1001", the processing proceeds to step S23, and the value of the number-of-frames count value frame_cnt from which "1001" is subtracted becomes a new number-of-frames count value frame_cnt. That is to say, in step S23 the number-of-frames count value frame_cnt is reset every 1001 frames. Subsequently, the processing returns to step S12, and the next display picture is prepared.

According to this processing, output as a three-frame group and output as a two-frame group are configured to be alternately switched for each frame of video data of 24 p based on the 3-2 pulldown flag flg_32pd. Subsequently, in the event that the frame of which the output is started at the time of output of a three-frame group is the 996th frame and thereafter in a 1001-frame cycle of video data of 60 p, the output in the relevant three-frame group is taken as only two frames, and thus thinning out of one frame is performed every 1001 frames.

Accordingly, the object to be subjected to thinning out of one frame every 1001 frames is restricted to a frame of a three-frame group, and a frame of a two-frame group is not thinned out, and thus, the difference of the number of frames between the group wherein thinning out of a frame has been performed, and the groups wherein thinning out has not been performed before and after the relevant group is prevented from exceeding one frame.

Note that the above-mentioned thinning out processing is one example, a thinning out processing method is not restricted to this example, wherein one frame is thinned out every 1001 frames, and also the difference of the number of frames between the group wherein thinning out of a frame has been performed, and the groups wherein thinning out has not been performed before and after the relevant group is prevented from exceeding one frame. For example, an arrangement may be considered wherein a frame to be thinned out is specified beforehand, and is held in unshown ROM or the like.

Also, description has been made above regarding the case wherein the 3-2 pulldown processing is performed, which alternately repeats the three-times repeat output and two-times repeat output of the same frame in order of the three-times repeat output and two-times repeat output for each frame of video data of 24 p, thereby converting the video data of 24 p into video data of 60 p. Embodiments of the present invention are not restricted to this example, and can be applied to the 2-3 pulldown processing which alternately repeats the two-times repeat output and three-times repeat output of the same frame in order of the two-times repeat output and three-times repeat output.

In the case of the 2-3 pulldown processing, as shown in FIG. 5, the 1001st frame (see FIG. 5A) and the 2002nd frame (see FIG. 5B) are frames of a two frame group, and the 3003rd frame (see FIG. 5C), the 4004th frame (see FIG. 5D), and the 5005th frame (see FIG. 5E) are frames of a three-frame group. Accordingly, upon thinning out being performed every 1001 frames, with the 1001st frame and the 2002nd frame, the remaining one frame of a two-frame group from which one frame is thinned out is played immediately after a three-frame group, following which playback of a three-frame group is performed, which causes an unnatural image at appearance.

In this case also, as with the above-mentioned 3-2 pulldown processing, in the event that the (1001×m)'th frame (m is a natural number) of video data of 60 p is included in a two-frame group, an arrangement is made wherein a frame of a three-frame group in the vicinity of the relevant two-frame group is subjected to the thinning out processing. That is to say, as exemplified in FIGS. 5A and 5B, the three-frame group immediately before the two-frame group including the 1001st frame, and the three-frame group immediately before the two-frame group including the 2002nd frame become objects to be subjected to thinning out.

As for specific processing, for example, in step S11 of the flowchart in FIG. 3, the initial value of the 3-2 pulldown flag flg_32pd needs to be set to "1". The processing in step S12 and thereafter is the same as those in the case of the above-mentioned 3-2 pulldown processing.

Next, description will be made regarding a modification of an embodiment of the present invention. With the above-mentioned embodiment, description has been made regarding the processing in the case of converting video data of 24 p into video data of 59.94 p. A modification of an embodiment of the present invention is an example applied to the case of converting progressive-scan (hereafter, 23.976 p) video data of which the frame frequency is 23.976 Hz into video data of 60 p.

In the event that video data of 23.976 p is converted into video data of 60 p, commonly, the video data of 23.976 Hz is converted into video data of 59.94 p once by the 3-2 pulldown processing or 2-3 pulldown processing, and video data of 60 p is obtained by inserting one frame every 1000 frames of the video data of 59.94 p.

Figure 6A:
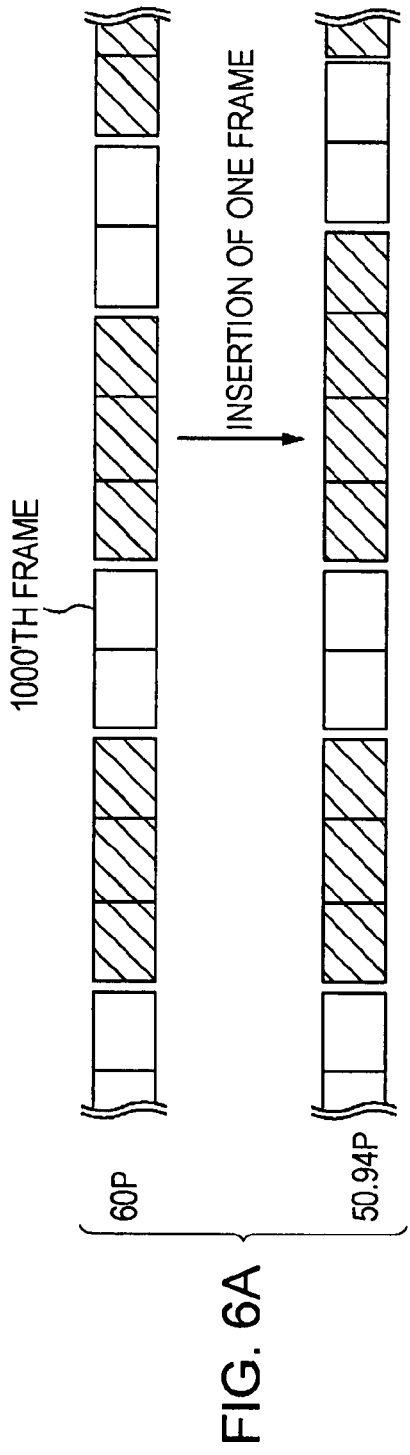
FIGS. 6A and 6B are schematic diagrams for describing an image processing method according to a modification of an embodiment of the present invention.

FIG. 6 illustrates an example of processing configured to convert video data of 59.94 p into video data of 60 p in the case of the 3-2 pulldown. In the case of the 3-2 pulldown, as one example is shown in FIG. 6A, the 1000th frame becomes the frame at the trailing edge of a two-frame group, and the next 1000 frame cycle is started from a three-frame group. Also, it is desirable from the perspective of each frame timing relation between video data of 59.94 p and video data of 60 p to perform insertion of one frame as to the video data of 59.94 p at the leading edge side of a 1000-frame cycle.

Now, upon one frame being inserted in a three-frame group at which a 1000 frame cycle is started, the next of the two-frame group including the 1000th frame is regarded as a group made up of a three-frame group in which the same frame is inserted, i.e., the same four frames, and the next thereof is regarded as a two-frame group. In this case, the same four frames are played immediately after a two-frame group, following which a two-frame group is played, and consequently, the difference of the number of frames between the group wherein frame insertion has been performed, and the groups wherein frame insertion has not been performed before and after the relevant group becomes not less than two, which causes the display thereof to be unnatural.

Figure 6B:
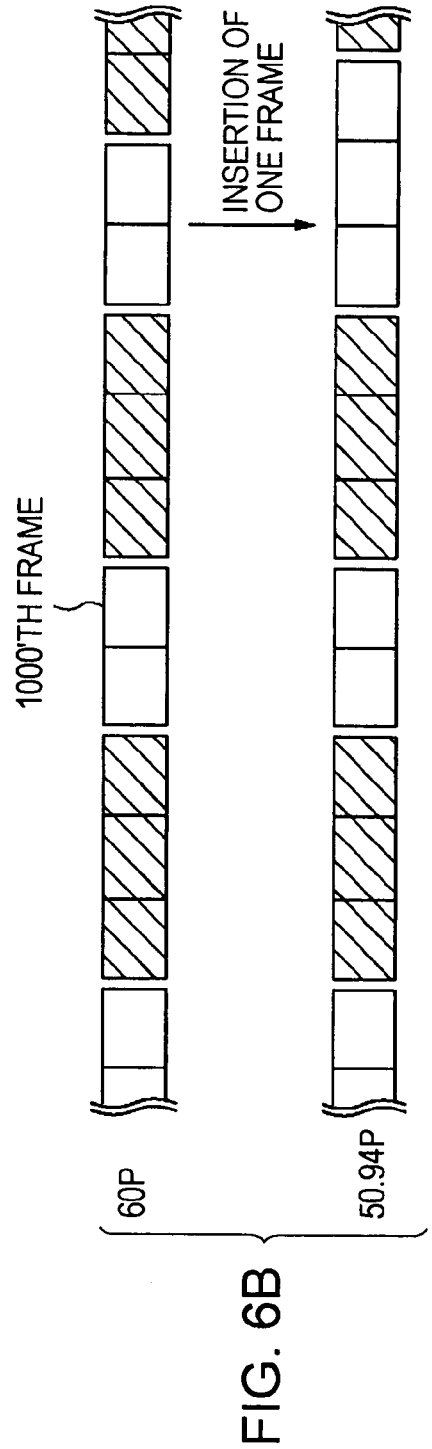
Figure 8:
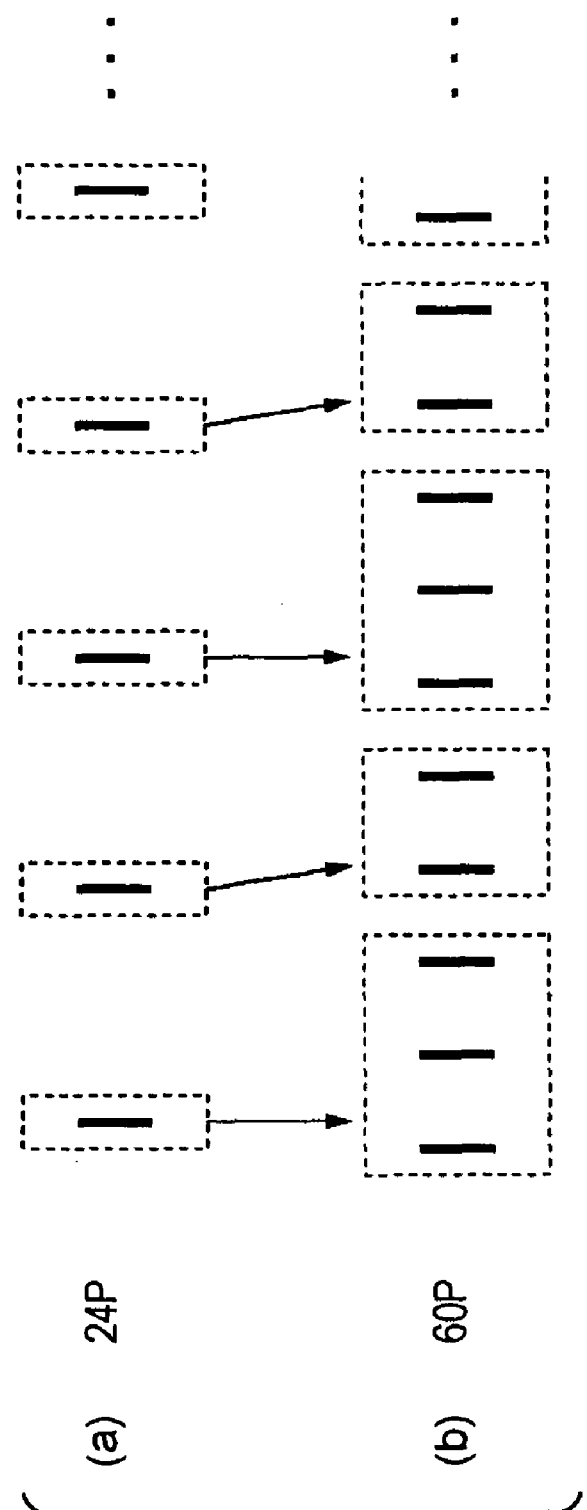
FIG. 8 is a schematic diagram for describing 3-2 pulldown processing.

Therefore, with a modification of an embodiment of the present invention, as one example is shown in FIG. 6B, in the case of the 3-2 pulldown, an arrangement is made wherein one frame is inserted into a two-frame group appearing first every 1000-frame cycle of video data of 59.94p generated at the 3-2 pulldown processing. Thus, the difference of the number of frames between the group wherein one frame insertion has been performed and the group wherein frame insertion has not been performed before and after the relevant group is less than two, thereby preventing unnatural display.

Note that processing configured to insert one frame is performed in 1000-frame cycle, whereby convert from video data of 59.94 p to video data of 60 p can be performed without shifting the insertion position of a frame as to a five-frame cycle due to the 3-2 pulldown processing or 2-3 pulldown processing. Therefore, the control unit 31 can perform the 3-2 pulldown processing and frame insertion processing fixedly in a 1000-frame cycle.

For example, the control unit 31 performs control wherein of the video data of 23.976 p decoded by the video decoder 14, and written in the frame memory 30, the frame corresponding to the leading edge of a 1000-frame cycle, and the next frame are read out from the frame memory 30 three times repeatedly, and thereinafter, as with the case of the normal 3-2 pulldown processing, the three-times repeat output and two-times repeat output of the same frame are alternately repeated in order of the three-times repeat output and two-times repeat output for each frame of 23.976 p.

Also, in the case of the 2-3 pulldown, as one example is shown in FIG. 7, the first frame in a 1000-frame cycle of video data of 59.94 p becomes a frame of a two-frame group, and even if insertion of one frame is performed as to the relevant two-frame group, the difference of the number of frames between the group wherein the frame insertion has been performed and the groups wherein the frame insertion has not been performed before and after the relevant group is less than two, which causes no unnatural display. Accordingly, in the case of the 2-3 pulldown, as with the case of the 3-2 pulldown, an arrangement is made wherein one frame insertion is performed as to a two-frame group to appear first in a 1000-frame cycle.

Note that description has been made above wherein the video conversion unit 15 includes the frame memory 30, and the control unit 31 controls the readout of video data from the frame memory 30, but the arrangement thereof is not restricted to this example. For example, an arrangement may be made wherein the output buffer of the video decoder 14 is controlled by the control unit 31.

Description has been made above wherein an embodiment of the present invention is applied to the case of converting video data of 24 p or 23.976 p into video data of 60 p or 59.94 p which is suitable for display of a monitor apparatus for example, but the present invention is not restricted to this example. For example, an embodiment of the present invention can be also applied to the case of converting video data of 24 p or 23.976 p into video data of which the field frequency for interlace scan is 60 Hz or 59.94 Hz which is suitable for display of a monitor apparatus for example.

Also, description has been made wherein, when converting video data of 24 p or 23.976 p decoded by the decoder into video data of 59.94 p or 60 p using the 3-2 pulldown or 2-3 pulldown processing, the control of thinning out of a frame or insertion of a frame is performed depending on the output of video data from the decoder, but the arrangement thereof is not restricted to this example. For example, with MPEG2, a flag arranged to control the repeat of a picture at the time of the 2-3 pulldown (Repeat First Field) is provided for each picture, but an arrangement can also be considered wherein this flag is rewritten at the playback apparatus 1, thereby performing the control of thinning out of a frame or insertion of a frame.

Further, description has been made above wherein the processing of thinning out of a frame or insertion of a frame at the time of converting video data of 24 p or 23.976 p into video data of 59.94 p or 60 p using the 3-2 pulldown or 2-3 pulldown processing is performed at the termination side in a 1001-frame cycle or 1000-frame cycle, but the arrangement thereof is not restricted to this example. That is to say, as long as the processing of thinning out of a frame or insertion of a frame is performed within a 1001-frame cycle or 1000-frame cycle, it is not asked where this processing should just be performed within a 1001-frame cycle or 1000-frame cycle.

Note that with the above description, for example, a flag indicating that the thinning out processing of one frame every 1001 frames, or the insertion processing of one frame every 1000 frames has been performed can be held at the video conversion unit 15. As one example, an arrangement may be considered wherein in the case of performing the thinning out processing of one frame every 1001 frames, this flag is configured to be reset every 1001 frames wherein thinning out is performed, and in the event that it is necessary to perform the thinning out processing, the video conversion unit 15 determines whether to perform the thinning out processing based on this flag. Employing such a flag enables handling even of cases wherein video data of 60 p and video data of 24 p are mixed, for example.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing method, comprising:
   a first conversion act configured to convert a first video signal having a first frame frequency into a second video signal having a second frame frequency, the ratio of the first frame frequency to the second frame frequency being 2:5, by outputting each frame of the first video signal either three times repeatedly or two times repeatedly; and
   a second conversion act configured to convert the second video signal having said second frame frequency converted in said first conversion act into a third video signal having a third frame frequency, the ratio of the second frame frequency to the third frame frequency being 1000:1001 or 1001:1000,
   wherein said second conversion act is configured to perform said conversion such that a difference of a number of frames between each first frame group and an adjacent second frame group is maintained to be less than or equal to one, wherein the first and second frame groups are based on the three-times and two-times repeated outputs according to the first conversion act, respectively.

2. The image processing method according to claim 1, wherein said first frame frequency is 24 Hz, said second frame frequency is 60 Hz, and said third frame frequency is approximately 59.94 Hz;
   and wherein said second conversion act is configured to not output one frame per 1001 frames of the second video signal.

3. The image processing method according to claim 2, wherein said second conversion act is configured to not output one frame of the first frame group within a 1001-frame cycle of the second video signal.

4. The image processing method according to claim 2, wherein said second conversion act is configured to not output one frame of the first frame group, the one frame appearing as the 997th frame or thereafter within a 1001-frame cycle of the second video signal.

5. The image processing method according to claim 1, wherein said first frame frequency is approximately 23.976 Hz, said second frame frequency is approximately 59.94 Hz, and said third frame frequency is 60 Hz;
   and wherein said second conversion act is configured to insert one frame per 1000 frames of the second video signal.

6. The image processing method according to claim 5, wherein said second conversion act is configured to insert one frame in the second frame group within a 1000-frame cycle of the second video signal.

7. The image processing method according to claim 5, wherein said second conversion act is configured to insert one frame in the second frame group, the second frame group appearing first within a 1000-frame cycle of the second video signal.

8. A computer program product embodied in computer readable memory, the computer program product comprising stored program instructions which, when executed by at least one processor, enable a computer apparatus to execute an image processing method comprising:
   a first conversion act configured to convert a first video signal having a first frame frequency into a second video signal having a second frame frequency, the ratio of the first frame frequency to the second frame frequency being 2:5, by outputting each frame of the first video signal either three times repeatedly or two times repeatedly; and
   a second conversion act configured to convert the second video signal having said second frame frequency converted in said first conversion act into a third video signal having a third frame frequency, the ratio of the second frame frequency to the third frame frequency being 1000:1001 or 1001:1000,
   wherein said second conversion act is further configured to determine whether to modify a first frame group or an adjacent second frame group such that a difference of a number of frames between the first frame group and the adjacent second frame group is maintained to be less than or equal to one, wherein the first and second frame groups are based on the three-times and two-times repeated outputs according to the first conversion act, respectively.

9. An image processing apparatus comprising:
a first conversion unit configured to convert a first video signal having a first frame frequency into a second video signal having a second frame frequency, the ratio of the first frame frequency to the second frame frequency being 2:5, by outputting each frame of the first video signal either three times repeatedly or two times repeatedly; and
a second conversion unit configured to convert the second video signal having said second frame frequency converted by said first conversion unit into a third video signal having a third frame frequency, the ratio of the second frame frequency to the third frame frequency being 1000:1001 or 1001:1000,
wherein said second conversion unit is further configured to determine whether to modify a first frame group or an adjacent second frame group such that a difference of a number of frames between the first frame group and the adjacent second frame group is maintained to be less than or equal to one, wherein the first and second frame groups are based on the three-times and two-times repeated outputs according to the first conversion unit, respectively.

10. A playback method comprising:
playing a video signal;
determining a frequency of frames of the video signal played in said playing act;
a first conversion act configured, in the event that a determination is made in said determining step that said video signal played in said playing act is a first video signal having a first frame frequency, to convert the first video signal having said first frame frequency into a second video signal having a second frame frequency, the ratio of the first frame frequency to the second frame frequency being 2:5, by outputting each frame of the first video signal either three times repeatedly or two times repeatedly; and
a second conversion act configured to convert the second video signal having said second frame frequency converted in said first conversion act into a third video signal having a third frame frequency, the ratio of the second frame frequency to the third frame frequency being 1000:1001 or 1001:1000,
wherein said second conversion act is configured to perform said conversion such that a difference of a number of frames between each first frame group and an adjacent second frame group is maintained to be less than or equal to one, wherein the first and second frame groups are based on the three-times and two-times repeated outputs according to the first conversion act, respectively.

11. The image processing method according to claim 10, wherein said first frame frequency is 24 Hz, said second frame frequency is 60 Hz, and said third frame frequency is approximately 59.94 Hz;
and wherein said second conversion act is configured to not output one frame per 1001 frames of the second video signal.

12. The image processing method according to claim 11, wherein said second conversion act is configured to not output one frame of the first frame group within a 1001-frame cycle of the second video signal.

13. The image processing method according to claim 11, wherein said second conversion act is configured to not output one frame of the first frame group, the one frame appearing as the 997th frame or thereafter within a 1001-frame cycle of the second video signal.

14. The image processing method according to claim 10, wherein said first frame frequency is approximately 23.976 Hz, said second frame frequency is approximately 59.94 Hz, and said third frame frequency is 60 Hz,
and wherein said second conversion act is configured to insert one frame per 1000 frames of the second video signal.

15. The image processing method according to claim 14, wherein said second conversion act is configured to insert one frame in the second frame group within a 1000-frame cycle of the second video signal.

16. The image processing method according to claim 14, wherein said second conversion act is configured to insert one frame in the second frame group, the second frame group appearing first within a 1000-frame cycle of the second video signal.

17. A computer program product embodied in computer readable memory, the computer program product comprising stored program instructions which, when executed by at least one processor, enable a computer apparatus to execute a playback method comprising:
playing a video signal;
determining a frequency of frames of the video signal played in said act of playing;
a first conversion act configured, in the event that a determination is made in said act of determining that said video signal played in said act of playing is a first video signal having a first frame frequency, to convert the first video signal having said first frame frequency into a second video signal having a second frame frequency, the ratio of the first frame frequency to the second frame frequency being 2:5, by outputting each frame of the first video signal either three times repeatedly or two times repeatedly; and
a second conversion act configured to convert the second video signal having said second frame frequency converted in said first conversion act into a third video signal having a third frame frequency, the ratio of the second frame frequency to the third frame frequency being 1000:1001 or 1001:1000,
wherein said second conversion act is further configured to determine whether to modify a first frame group or an adjacent second frame group such that a difference of a number of frames between the first frame group and the adjacent second frame group is maintained to be less than or equal to one, wherein the first and second frame groups are based on the three-times and two-times repeated outputs according to the first conversion act, respectively.

18. A playback apparatus comprising:
a playback unit configured to play a video signal;
a determining unit configured to determine a frequency of frames of the video signal played with said playback unit;
a first conversion unit configured, in the event that a determination is made with said determining unit that said video signal played with said playback unit is a first video signal having a first frame frequency, to convert the first video signal having said first frame frequency into a second video signal having a second frame frequency, the ratio of the first frame frequency to the second frame frequency being 2:5, by outputting each frame of the first video signal either three times repeatedly or two times repeatedly; and a second conversion unit configured to convert the second video signal having said second frame frequency converted with said first conversion unit into a third video signal having a third frame frequency, the ratio of the second frame frequency to the third frame frequency being 1000:1001 or 1001:1000, wherein said second conversion unit is further configured to determine whether to modify a first frame group or an adjacent second frame group such that a difference of a number of frames between the first frame group and the adjacent second frame group is maintained to be less than or equal to one, wherein the first and second frame groups are based on the three-times and two-times repeated outputs according to the first conversion unit, respectively.

\* \* \* \* \*